L. LE BOZEC.
AUTOMATIC VALVE.
APPLICATION FILED AUG. 6, 1917.

1,269,616.

Patented June 18, 1918.

Inventor:-
Leon Le Bozec.
By:- B. Singer
Atty.

UNITED STATES PATENT OFFICE.

LÉON LE BOZEC, OF BÉCON-LES-BRUYÈRES, FRANCE.

AUTOMATIC VALVE.

1,269,616.      Specification of Letters Patent.      Patented June 18, 1918.

Application filed August 6, 1917. Serial No. 184,790.

*To all whom it may concern:*

Be it known that I, LÉON LE BOZEC, residing at Bécon-les-Bruyères, France, have invented new and useful Improvements in Automatic Valves, of which the following is a specification.

This invention relates to an automatic valve device which is adapted to work whatever be the direction in which it is fitted.

Figure 1:
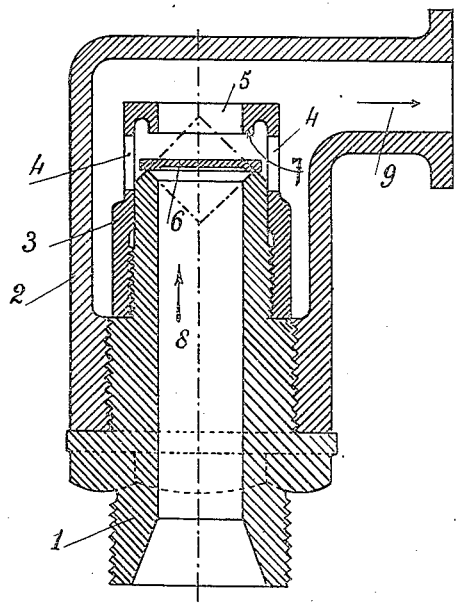
Figure 2:
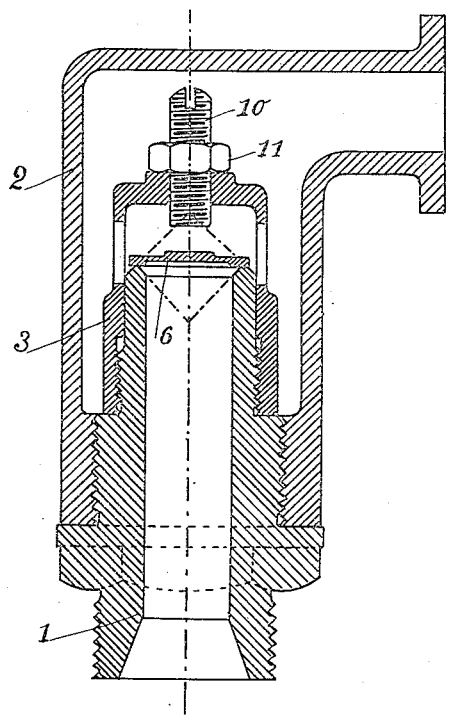

Two constructions according to the invention are illustrated by way of example, in Figures 1 and 2 of the accompanying drawing.

In Fig. 1, 1 is a nipple intended to be connected to a liquid supply pipe. It is introduced, by screwing or otherwise, into the interior of a pipe 2 for discharging the liquid. The latter is shown bent, but obviously it can be straight, so that the liquid escapes in the same direction as that in which it enters the device.

That end of the nipple 1, which is in the pipe 2, is surmounted by a cylindrical cage 3 provided laterally with holes 4, and in the longitudinal axis with a hole 5 preferably of a diameter at least equal to that of the hole in the nipple 1. The end of the nipple 1 has an annular beveled edge formed by the intersection of two cones arranged in opposite directions and having the same longitudinal axis. One of the cones could be replaced without any inconvenience by a cylinder. Opposite the said beveled edge on which rests the valve 6 constituted by a thin disk preferably recessed in the center on its lower face for the purpose of facilitating machining and for reducing its weight, the cage 3 has an annular projection 7 around the hole 5.

It will be understood that the liquid admitted through the nipple 1 in the direction of the arrow 8, raises the valve 6 into contact with the annular projection 7 and passes into the pipe 2, through the holes 4 and is discharged in the direction of the arrow 9.

When the admission of the liquid through the nipple 1 is stopped, back flow of liquid is prevented, because the said liquid, in passing through the hole 5, automatically brings the valve 6 back to its annular seat whether the device be vertical, inclined or horizontal, and whether the nipple 1 be arranged below or above the part 2.

It must be pointed out that the annular seat of the valve 6, has a surface which is theoretically zero, and in practice exceedingly small; so that the pressure per unit of the said edge is very high for a small pressure on the valve, the tight joint of which is thus insured for either a liquid or a gas.

In Fig. 2, the cylindrical cage 3 is not open opposite the valve, and the device cannot be applied unless the part 1 occupies a position—whether inclined or not—below that of the part 2 which again need not be bent. In this case the cage 3 is provided with a screw stop 10, the position of which is secured by the lock nut 11 and which is intended to limit and to regulate the movement of the valve 6.

Having now particularly described and ascertained the nature of my said invention and in what manner the same is to be performed, I declare that what I claim is:

1. A valve of the character described, comprising in combination, a pipe conduit, a valve casing or cage within said conduit, a nipple secured in said casing, a disk reinforced at its margin capping said nipple, an annular projection on the inner face of said cage facing said nipple, said casing having lateral holes and an enlarged axial hole for automatically preventing back flow of the liquid passed through said nipple, valve and cage into said conduit, substantially as described.

2. A valve of the character described, comprising in combination, a pipe conduit, a valve casing or cage within said conduit, a nipple secured in said casing, a disk reinforced at its margin capping said nipple, said casing having lateral holes for automatically preventing back flow of the liquid passed through said nipple, valve and cage into said conduit, and means for limiting the axial displacement of said disk; the end of said nipple having an annular beveled edge formed by the intersection of two cones arranged in opposite directions and having the same longitudinal axis, substantially as described and for the purpose set forth.

In testimony whereof I affix my signature in presence of two witnesses.

LÉON LE BOZEC.

Witnesses:
   CHAS. P. PRESSLY,
   JULES LEBRUE.